United States Patent
Zimmer et al.

(10) Patent No.: US 7,162,626 B2
(45) Date of Patent: Jan. 9, 2007

(54) USE OF COMMON LANGUAGE INFRASTRUCTURE FOR SHARING DRIVERS AND EXECUTABLE CONTENT ACROSS EXECUTION ENVIRONMENTS

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 10/671,362

(22) Filed: Sep. 25, 2003

(65) Prior Publication Data

US 2005/0071616 A1  Mar. 31, 2005

(51) Int. Cl.
*G06F 13/10* (2006.01)

(52) U.S. Cl. .............................................. 713/2; 713/1
(58) Field of Classification Search ................... 713/1, 713/2
See application file for complete search history.

(56) References Cited

U.S. PATENT DOCUMENTS 6,560,774 B1 * 5/2003 Gordon et al. .............. 717/146
6,978,018 B1 * 12/2005 Zimmer ....................... 380/30

OTHER PUBLICATIONS

Adelstein et al., "Malicious Code Detection for Open Firmware", 18th Annual Computer Security Applications Conference, Dec. 9-13, 2002.*

* cited by examiner

Primary Examiner—Thomas Lee
Assistant Examiner—Albert Wang
(74) Attorney, Agent, or Firm—Blakely, Sokoloff, Taylor & Zafman LLP

(57) ABSTRACT

Methods and systems for allocating address space resources to resource requesting peripheral devices in an efficient manner. Resource request are gathered for enumerated peripheral devices host by a computer platform. A map containing resource alignment requirements is built, and a virtual resource allocation map is computed based on aggregated resource requests and the alignment requirements. The resource aggregations are, in turn, based on a hierarchy of the peripheral devices. A bin-packing algorithm is employed to determine allocation of the resource requests so as to minimize resource address space allocations. The virtual resource map is then used to perform actual resource allocations. The resources include peripheral device I/O address allocation and peripheral device memory address allocations.

30 Claims, 5 Drawing Sheets

USE OF COMMON LANGUAGE INFRASTRUCTURE FOR SHARING DRIVERS AND EXECUTABLE CONTENT ACROSS EXECUTION ENVIRONMENTS

FIELD OF THE INVENTION

The field of invention relates generally to computer system and, more specifically but not exclusively relates to employing common language infrastructure to enable drivers and executable content to be shared across execution environments.

BACKGROUND INFORMATION

Computer platform firmware is used during initialization of computer systems to verify system integrity and configuration. It also generally provides the basic low-level interface between hardware and software components of those computer systems, enabling specific hardware functions to be implemented via execution of higher-level software instructions contained in computer programs that run on the computer systems. In many computers, a primary portion of this firmware is known as the Basic Input/Output System (BIOS) code of a computer system. The BIOS code comprises a set of permanently recorded (or semi-permanently recorded in the case of systems that use flash BIOS) software routines that provides the system with its fundamental operational characteristics, including instructions telling the computer how to test itself when it is turned on, and how to determine the configurations for various built-in components and add-on peripherals.

Typically, firmware code is stored in a "monolithic" form comprising a single set of code that is provided by a platform manufacturer or a BIOS vendor such as Phoenix or AMI. Various portions of the single set of code are used to initialize different system components, and to provide various runtime services. Since there is only a single set of code, the trustworthiness and reliability of the firmware may be verified through testing by its producer. In other situations, a monolithic BIOS may be extended using one or more "Option ROMs" that are contained on one or more periphery device cards. For example, SCSI device driver cards and video cards often include an option ROM that contains BIOS code corresponding to services provided by these cards. Typically, firmware in option ROMs is loaded after the firmware in the monolithic BIOS has been loaded or during loading of the monolithic BIOS in accordance with a predefined scheme.

Recently, a new firmware architecture has been defined that enables platform firmware to include firmware "modules" and "drivers" that may be provided by one or more third party vendors in addition to the firmware provided by a platform manufacturer or BIOS vendor that is originally supplied with a computer system. This firmware architecture is called the Extensible Firmware Interface (EFI) (specifications and examples of which may be found at http://developer.intel.com/technology/efi). EFI is a public industry specification that describes an abstract programmatic interface between platform firmware and shrink-wrap operation systems or other custom application environments. The EFI framework include provisions for extending BIOS functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks.

Another consideration for firmware development is the ability to port code to different processor instruction sets and across platform architectures. To address this development aspect, the EFI framework provides a processor-independent intermediate language (IL) known as EFI byte code or EBC. Drivers and modules written in EBC are interpreted at execution time by an appropriate interpreter for the platform, enabling a common set of EBC to support different platform architectures.

Although the EFI framework provides many advantages, it opens up the opportunity for a system to be disabled or damaged through use of an errant or rogue firmware module or driver. For example, a flawed firmware module may not operate properly, causing one or more system components to be disabled. Even worse, it may cause problems to the operation of other firmware components and modules. This problem is further exacerbated when EBC is employed. For implementation simplicity, EBC does not provide formalized type-safety guarantees, such as those found in other intermediate languages (e.g., Java). As a result, the behavior of EBC code on different platform architectures is not always predictable, and there are no existing provisions to ensure safe execution.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of methods and systems for sharing type-safe firmware components across execution environments are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, a firmware/software component Common Language Infrastructure (CLI) implementation is disclosed that enables modules and components written in a type-safe intermediate language to be employed across execution environments, including pre-boot and operation system runtime environments. In one embodiment, the CLI is implemented in connection with an EFI-based architecture in combination with run-time programmatic infrastructure. In order to understand how EFI may be leveraged under an embodiment of the invention, an overview of EFI operations in accordance with one exemplary platform initialization scheme will now be discussed.

Figure 1:
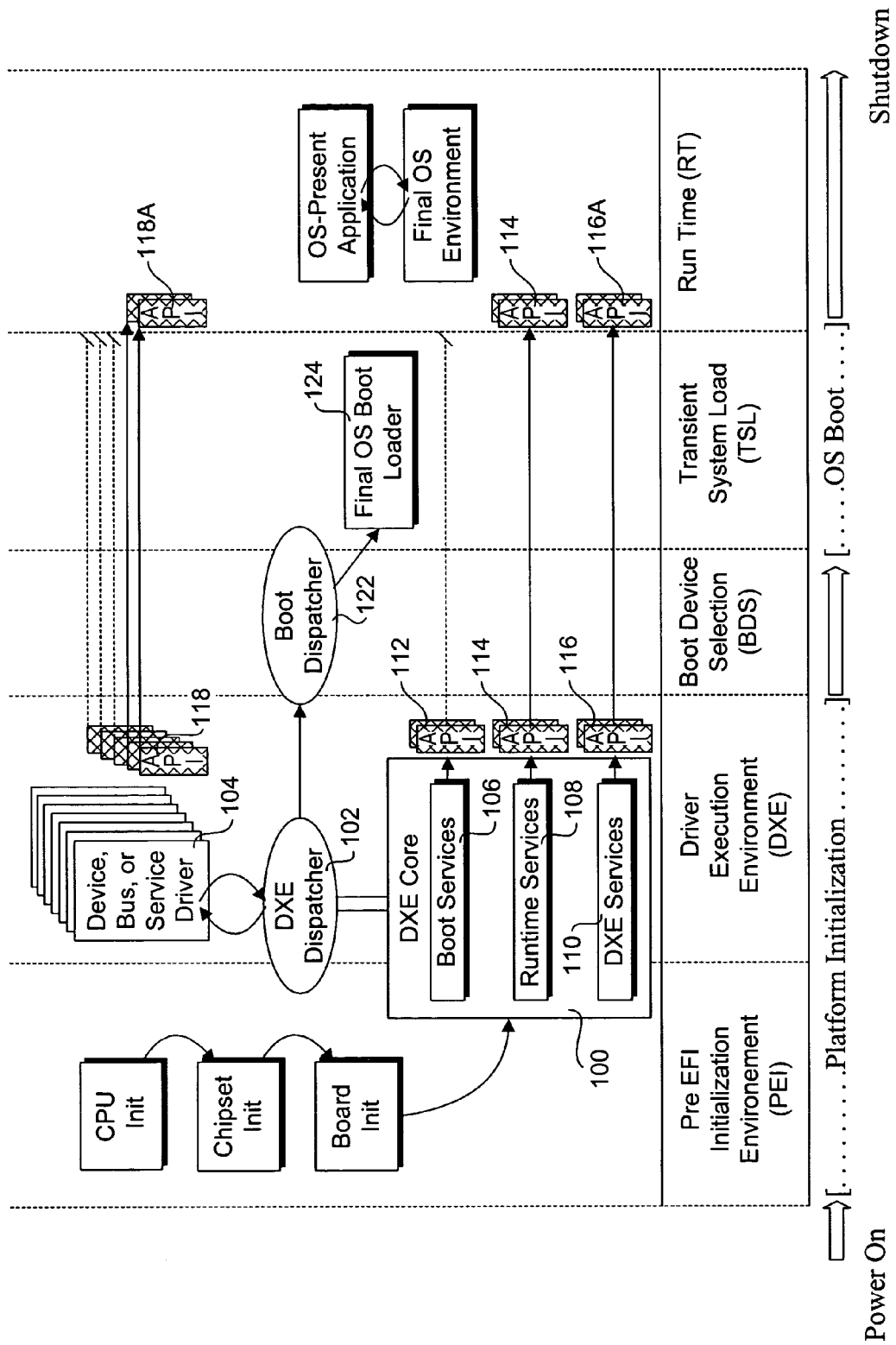
FIG. 1 is a schematic diagram illustrating the various execution phases that are performed in accordance with the extensible firmware interface (EFI) framework.

FIG. 1 shows an event sequence/architecture diagram used to illustrate operations performed by a platform under the EFI framework in response to a cold boot (e.g., a power off/on reset). The process is logically divided into several phases, including a pre-EFI Initialization Environment (PEI) phase, a Driver Execution Environment (DXE) phase, a Boot Device Selection (BDS) phase, a Transient System Load (TSL) phase, and an operating system runtime (RT) phase. The phases build upon one another to provide an appropriate run-time environment for the OS and platform.

The PEI phase provides a standardized method of loading and invoking specific initial configuration routines for the processor (CPU), chipset, and motherboard. The PEI phase is responsible for initializing enough of the system to provide a stable base for the follow on phases. Initialization of the platforms core components, including the CPU, chipset and main board (i.e., motherboard) is performed during the PEI phase. This phase is also referred to as the "early initialization" phase. Typical operations performed during this phase include the POST (power-on self test) operations, and discovery of platform resources. In particular, the PEI phase discovers memory and prepares a resource map that is handed off to the DXE phase. The state of the system at the end of the PEI phase is passed to the DXE phase through a list of position independent data structures called Hand Off Blocks (HOBs).

The DXE phase is the phase during which most of the system initialization is performed. The DXE phase is facilitated by several components, including the DXE core 100, the DXE dispatcher 102, and a set of DXE drivers 104. The DXE core 100 produces a set of Boot Services 106, Runtime Services 108, and DXE Services 110. The DXE dispatcher 102 is responsible for discovering and executing DXE drivers 104 in the correct order. The DXE drivers 104 are responsible for initializing the processor, chipset, and platform components as well as providing software abstractions for console and boot devices. These components work together to initialize the platform and provide the services required to boot an operating system. The DXE and the Boot Device Selection phases work together to establish consoles and attempt the booting of operating systems. The DXE phase is terminated when an operating system successfully begins its boot process (i.e., the BDS phase starts). Only the runtime services and selected DXE services provided by the DXE core and selected services provided by runtime DXE drivers are allowed to persist into the OS runtime environment. The result of DXE is the presentation of a fully-formed EFI interface.

The DXE core is designed to be completely portable with no CPU, chipset, or platform dependencies. This is accomplished by designing in several features. First, the DXE core only depends upon the HOB list for its initial state. This means that the DXE core does not depend on any services from a previous phase, so all the prior phases can be unloaded once the HOB list is passed to the DXE core. Second, the DXE core does not contain any hard coded addresses. This means that the DXE core can be loaded anywhere in physical memory, and it can function correctly no matter where physical memory or where Firmware segments are located in the processor's physical address space. Third, the DXE core does not contain any CPU-specific, chipset specific, or platform specific information. Instead, the DXE core is abstracted from the system hardware through a set of architectural protocol interfaces. These architectural protocol interfaces are produced by DXE drivers 104, which are invoked by DXE Dispatcher 102.

Figure 2:
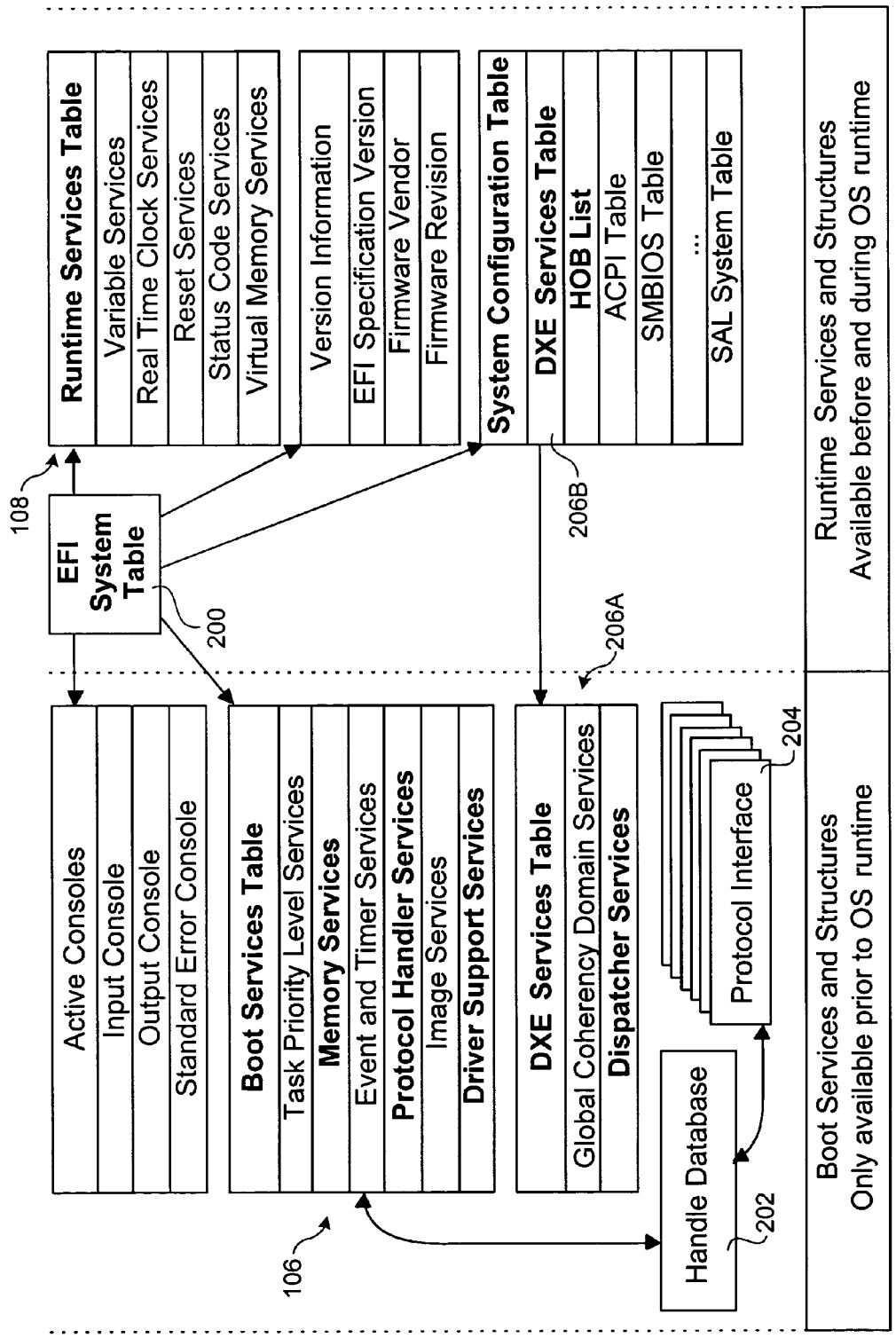
FIG. 2 is a block schematic diagram illustrating various components of an EFI system table that is used to enable an operating system to access EFI components during OS runtime operations.

The DXE core produces an EFI System Table 200 and its associated set of Boot Services 106 and Runtime Services 108, as shown in FIG. 2. The DXE Core also maintains a handle database 202. The handle database comprises a list of one or more handles, wherein a handle is a list of one or more unique protocol GUIDs (Globally Unique Identifiers) that map to respective protocols 204. A protocol is a software abstraction for a set of services. Some protocols abstract I/O devices, and other protocols abstract a common set of system services. A protocol typically contains a set of APIs and some number of data fields. Every protocol is named by a GUID, and the DXE Core produces services that allow protocols to be registered in the handle database. As the DXE Dispatcher executes DXE drivers, additional protocols will be added to the handle database including the architectural protocols used to abstract the DXE Core from platform specific details.

The Boot Services comprise a set of services that are used during the DXE and BDS phases. Among others, these services include Memory Services, Protocol Handler Services, and Driver Support Services: Memory Services provide services to allocate and free memory pages and allocate and free the memory pool on byte boundaries. It also provides a service to retrieve a map of all the current physical memory usage in the platform. Protocol Handler Services provides services to add and remove handles from the handle database. It also provides services to add and remove protocols from the handles in the handle database. Addition services are available that allow any component to lookup handles in the handle database, and open and close protocols in the handle database. Support Services provides services to connect and disconnect drivers to devices in the platform. These services are used by the BDS phase to either connect all drivers to all devices, or to connect only the minimum number of drivers to devices required to establish the consoles and boot an operating system (i.e., for supporting a fast boot mechanism).

The DXE Services Table includes data corresponding to a first set of DXE services 206A that are available during pre-boot only, and a second set of DXE services 206B that are available during both pre-boot and OS runtime. The pre-boot only services include Global Coherency Domain Services, which provide services to manage I/O resources, memory mapped I/O resources, and system memory resources in the platform. Also included are DXE Dispatcher Services, which provide services to manage DXE drivers that are being dispatched by the DXE dispatcher.

The services offered by each of Boot Services 106, Runtime Services 108, and DXE services 110 are accessed via respective sets of API's 112, 114, and 116. The API's provide an abstracted interface that enables subsequently loaded components to leverage selected services provided by the DXE Core.

After DXE Core 100 is initialized, control is handed to DXE Dispatcher 102. The DXE Dispatcher is responsible for loading and invoking DXE drivers found in firmware volumes, which correspond to the logical storage units from which firmware is loaded under the EFI framework. The DXE dispatcher searches for drivers in the firmware volumes described by the HOB List. As execution continues, other firmware volumes might be located. When they are, the dispatcher searches them for drivers as well.

There are two subclasses of DXE drivers. The first subclass includes DXE drivers that execute very early in the DXE phase. The execution order of these DXE drivers depends on the presence and contents of an a priori file and the evaluation of dependency expressions. These early DXE drivers will typically contain processor, chipset, and platform initialization code. These early drivers will also typically produce the architectural protocols that are required for the DXE core to produce its full complement of Boot Services and Runtime Services.

The second class of DXE drivers are those that comply with the EFI 1.10 Driver Model. These drivers do not perform any hardware initialization when they are executed by the DXE dispatcher. Instead, they register a Driver Binding Protocol interface in the handle database. The set of Driver Binding Protocols are used by the BDS phase to connect the drivers to the devices required to establish consoles and provide access to boot devices. The DXE Drivers that comply with the EFI 1.10 Driver Model ultimately provide software abstractions for console devices and boot devices when they are explicitly asked to do so.

Any DXE driver may consume the Boot Services and Runtime Services to perform their functions. However, the early DXE drivers need to be aware that not all of these services may be available when they execute because all of the architectural protocols might not have been registered yet. DXE drivers must use dependency expressions to guarantee that the services and protocol interfaces they require are available before they are executed.

The DXE drivers that comply with the EFI 1.10 Driver Model do not need to be concerned with this possibility. These drivers simply register the Driver Binding Protocol in the handle database when they are executed. This operation can be performed without the use of any architectural protocols. In connection with registration of the Driver Binding Protocols, a DXE driver may "publish" an API by using the InstallConfigurationTable function. This published drivers are depicted by API's 118. Under EFI, publication of an API exposes the API for access by other firmware components. The API's provide interfaces for the Device, Bus, or Service to which the DXE driver corresponds during their respective lifetimes.

The BDS architectural protocol executes during the BDS phase. The BDS architectural protocol locates and loads various applications that execute in the pre-boot services environment. Such applications might represent a traditional OS boot loader, or extended services that might run instead of, or prior to loading the final OS. Such extended pre-boot services might include setup configuration, extended diagnostics, flash update support, OEM value-adds, or the OS boot code. A Boot Dispatcher 120 is used during the BDS phase to enable selection of a Boot target, e.g., an OS to be booted by the system.

During the TSL phase, a final OS Boot loader 122 is run to load the selected OS. Once the OS has been loaded, there is no further need for the Boot Services 106, and for many of the services provided in connection with DXE drivers 104 via API's 118, as well as DXE Services 206A. Accordingly, these reduced sets of API's that may be accessed during OS runtime are depicted as API's 116A, and 118A in FIG. 1.

Normally, EFI drivers are written in C language and then compiled into a .EFI executable. Since C is not (completely) a type-safe language, the compiled .EFI executable is likewise non type-safe. For example, C allows direct manipulation of values in memory using pointer indirection. Another disadvantage of the traditional EFI compilation model is that separate compilers must be used for different platform targets. This leads to platform-specific code rewrites and requires extensive testing to ensure reliability. Even with such testing, there is no guarantee of proper operation when the platform firmware is extended via third-party EFI components.

This problem is addressed by embodiments of the invention through use of a type-safe intermediate language and corresponding execution infrastructure in combination with a modified EFI-based loading scheme. In one embodiment, the intermediate language is written to run on the Common Language Infrastructure (CLI), which has been standardized via the EMCA-335 specification (European Computer Manufacturers Association, http://www.ecma-international.org.), and is part of the Microsoft .Net (http://www.microsoft.com/net/) initiative to support CPU-neutral encodings.

An important aspect of the CLI is that its intermediate language (IL) encoding lends itself to both build and runtime verification. Such verification includes but is not limited to memory-safety and strong type-safety guarantees. As such, the combination of C/C++ compilers that emit IL with the large body of existing EFI driver C code will enable BIOS and platform venders and the like to more easily implement firmware solutions that employ type-safe IL-encoded .EFI files.

The ability to have code-safety guarantees in the pre-boot is important for several reasons. First, there is not the usual process model with memory protections to guard against malicious or errant code. Second, some pre-boot drivers are actually guest-hosted in the operating system runtime in order to abstract some platform specific behavior; the most notable examples of this include the OS invocation of video BIOS via Int10h or the EFI Universal Graphics Adapter (UGA) Draw service at OS runtime. By using the IL encoding, the OS can use its OS-present Just_in_Time (JIT) compiler(s) to support time-and space-efficient instances of the pre-boot, IL-encoded content.

The Common Language Infrastructure provides a specification for executable code and the execution environment (the Virtual Execution System, or VES) in which it runs. Executable code is presented to the VES as modules. A module is a single file containing executable content in the format specified in partition II of the ECMA-335 specification. At the center of the Common Language Infrastructure is a unified type system, the Common Type System (CTS), which is shared by compilers, tools, and the CLI itself. It is the model that defines the rules the CLI follows when declaring, using, and managing types. The CTS establishes a framework that enables cross-language integration, type safety, and high performance code execution.

Type-safety is guaranteed, in part, through CLI's Common Type System. The CTS provides a rich type system that supports the types and operations found in many programming languages. The Common Type System is intended to support the complete implementation of a wide range of programming languages. The CLI uses metadata to describe and reference the types defined by the Common Type System. Metadata is stored ("persisted") in a way that is independent of any particular programming language. Thus, metadata provides a common interchange mechanism for use between tools that manipulate programs (compilers, debuggers, etc.) as well as between these tools and the Virtual Execution System.

CLI is implemented via the Common Language Specification (CLS), which comprises an agreement between language designers and framework (class library) designers. It specifies a subset of the CTS Type System and a set of usage conventions. Languages provide their users the greatest ability to access frameworks by implementing at least those parts of the CTS that are part of the CLS. Similarly, frameworks will be most widely used if their publicly exposed aspects (classes, interfaces, methods, fields, etc.) use only types that are part of the CLS and adhere to the CLS conventions.

CLI IL-compliant code is executed via the Virtual Execution System (VES). The VES implements and enforces the CTS model. The VES is responsible for loading and running programs written for the CLI. It provides the services needed to execute managed code and data, using the metadata to connect separately generated modules together at runtime (late binding). The VES supports both interpreters and compilers.

Together, these aspects of the CLI form a unifying framework for designing, developing, deploying, and executing distributed components and applications. The appropriate subset of the Common Type System is available from each programming language that targets the CLI. Language-based tools communicate with each other and with the Virtual Execution System using metadata to define and reference the types used to construct the application. The Virtual Execution System uses the metadata to create instances of the types as needed and to provide data type information to other parts of the infrastructure (such as remoting services, assembly downloading, security, etc.).

Figure 3:
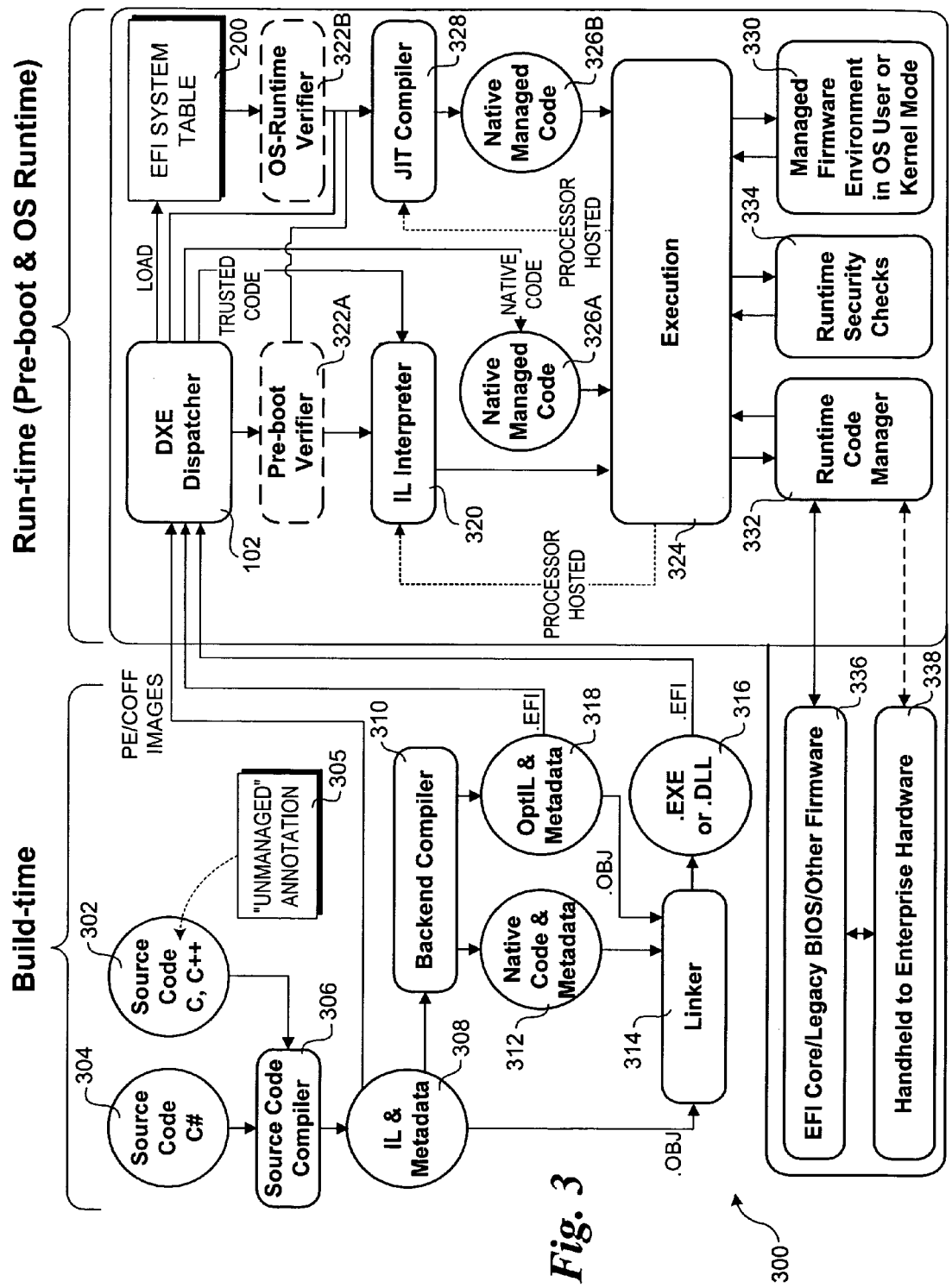
FIG. 3 is a schematic diagram illustrating a build-time and run-time framework for supporting development and processing of type-safe firmware components in accordance with one embodiment of the invention.

FIG. 3 shows an exemplary build and execution framework 300 that enables type-safe IL encodings to be employed for both pre-boot and operating system runtime firmware services in accordance with one embodiment of the invention. The basic framework is derived from Microsoft Corporation's .NET framework, which provides various development and execution environments that support CLI. Extensions have been added to the framework to support both pre-boot and OS-runtime access to the IL encodings.

A typical implementation involves two major phases. The first phase, depicted at the left hand of FIG. 3, concerns generating the IL encodings. The build process begins by writing source code in an appropriate language for which CLI IL may be compiled. As discussed above, IL compilers are available for many well-known languages, including C and C++, as depicted by a block 302. Another language that is commonly employed for .NET implementation is Microsoft's C# (depicted at a block 304), an object-oriented language having similar constructs to Java.

Although C and C++ provide some level of type-safety, they also allow code to be written that is not type-safe. For instance, C allows direct casting to memory locations, which may produce errors if improperly coded. To account for inclusion of non type-safe code portions, the source C or C++ may include one or more "unmanaged" annotations 305, identifying corresponding portions of code that are not type safe.

The source code 302 or 304 is initially compiled by a source code compiler 306 into intermediate language code and metadata 308 having a format corresponding to the PE/COFF (Portable Executable/Common Object File Format) specification (http://www.microsoft.com/whdc/hwdev/hardware/pecoff.mspx). Any portions of C or C++ code 302 annotated with the "unmanaged" annotation will be marked by the compiler as "unsafe." Rather than being compiled for a specific processor instruction set, the IL is processor-neutral (and platform-independent). Thus, execution of the IL code must be effectuated by either an interpreter or a compiler hosted by a platform processor, rather than directly by the processor.

The metadata is a structured way to represent all information that the CLI uses to locate and load classes, lay out instances in memory, resolve method invocations, translate CIL to native code, enforce security, and set up runtime context boundaries. Every CLI PE/COFF module carries a compact metadata binary that is emitted into the module by the CLI-enabled development tool or compiler.

Source code may be compiled using different compilation techniques so as to support real-time processing at different execution levels. At a basic level corresponding to IL and metadata 308, the IL code may be processed via an IL-compatible interpreter or JIT compiler that is configured for the target platform instruction set. In some instances, faster execution is desired, or in the case of pre-boot, and interpreter or compiler may not yet exist. Accordingly, a backend compiler 310 may be employed to perform further compilation operations on IL and metadata 308.

In one implementation, backend compiler 310 is used to generate native code and metadata 312. The native code refers to machine code that may (once linked) be executed directly by a processor having a specific instruction set supported by the backend compiler. Linking is performed by a linker 314, which generates an .EXE (executable) or .DLL (dynamic link library) PE/COFF image 316. An advantage of this scheme, when compared with directly compiling C or C++ code into executable code, is that type-safeness is enhanced, and post-compilation type-safety verification may be employed. Rather than stored as an .EXE or .DLL file, the generated module's extension is change to .EFI so as to be recognized by DXE dispatcher 102 as an EFI module.

As another option, backend compiler 310 may be used to generate Optimized intermediate language (OptIL) and metadata 318. This code is similar to IL and metadata 308, but is optimized for speed and/or size considerations.

As discussed above, the type-safe IL may be shared across execution environments. For example, the same IL encodings may be used by the platform for limited-resource pre-boot operations, and subsequently by the operating system for OS-runtime operations in a rich-resource environment. In either case, the .EFI images must first be loaded into the execution environment prior to being interpreted or JIT compiled (a.k.a. "JIT-ed.")

In accordance with the EFI platform initialization scheme of FIGS. 1 and 2, .EFI images are retrieved by DXE dispatcher 102 and loaded into a target IL code processing means. At a high level, the instruction processing means include IL interpreters and Just-in-Time compilers. Under a typical implementation, an IL interpreter will be used during the pre-boot to process IL-encoded .EFI modules, while a JIT compiler will be used during operating system runtime. The reason for this is that the size requirements for an IL interpreter are significantly smaller than those for a JIT compiler. Since the storage space of most platform firmware storage devices is limited, there generally will not be enough room to store a JIT compiler in the firmware. However, in some embodiments a JIT compiler may be used for both pre-boot and OS-runtime processing of the IL encodings.

The left hand portion of the Run-time phase of FIG. 3 illustrates a typical embodiment in which pre-boot processing of IL encodings is performed by an IL interpreter 320. In one embodiment, DXE dispatcher loads an IL-encoded .EFI image into IL interpreter directly. In an optional embodiment, the EFI image may be processed by a verifier 322 prior to being interpreted by IL interpreter 320, in accordance with execution-time verification. In essence, the verifier verifies type correctness by examining the IL code in connection with the metadata. In one embodiment, IL interpreter 320 comprises native code that is loaded via DXE dispatcher 102 prior to loading and interpreting IL-encoded images and executed by the platform processor during interpreting operations, as depicted by an execution block 324.

In some instances it may be necessary or desired to execute pre-compiled .EFI images directly. For example, IL interpreter 320 must be loaded prior to interpreting any IL-encoded .EFI images, requiring it to comprise native code. In another instance, an EFI component may be used repeatedly during the pre-boot. Rather than re-interpret the component for each use, it may be compiled into native code and directly executed. In addition, if the build-time operations of FIG. 3 are employed, the native code will comprise type-safe native managed code 326A.

As discussed above, OS-runtime use of the IL-encoded .EFI images will generally employ a JIT compiler. A primary reason for this is that compiled code executes must faster than interpreted code, and once an IL-encoding is compiled it can be stored in memory (i.e., cached) for subsequent use, while interpreted code must be re-interpreted for each access request. In order to make the .EFI images accessible to OS-runtime, handles to the images are first loaded into EFI system table 200, as discussed above with reference to FIGS. 1 and 2. Subsequently, the image may be loaded (via a corresponding handle or API abstraction) by the operating system into a JIT compiler 328 for "on-demand" processing. In a manner similar to pre-boot use, the .EFI image may be first run through an OS-runtime verifier 322B, which performs verification services similar to pre-boot verifier 322A.

Figure 4:
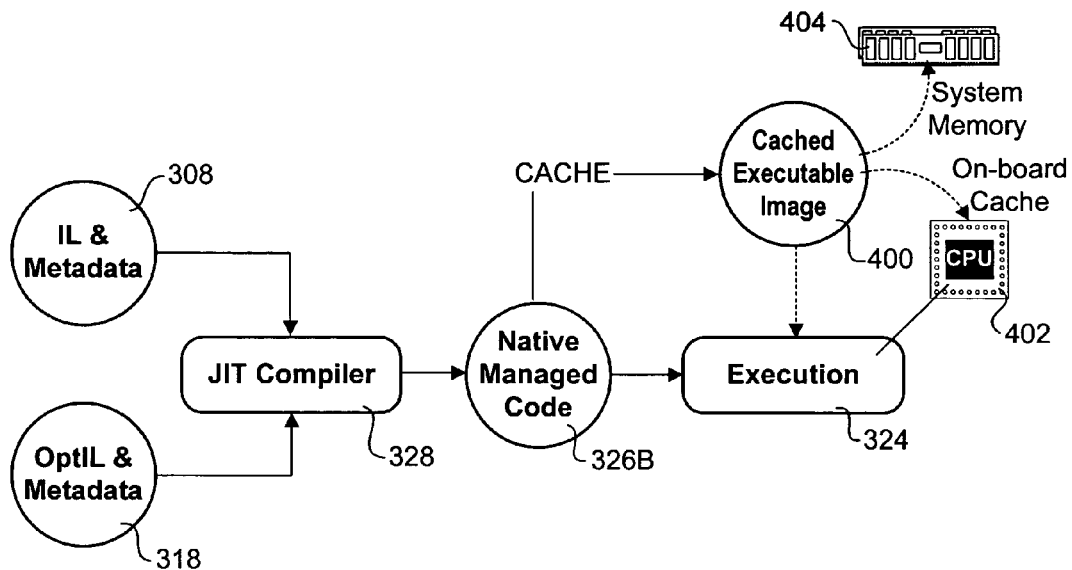
FIG. 4 is a process flow diagram illustrating caching of executable type-safe firmware images in accordance with one embodiment of the invention.

The JIT compiler 328 runs on the platform processor, and accordingly is loaded for execution prior to processing an IL-encoded .EFI image. The JIT compilation produces native managed code 326B, which may be directly executed via execution block 324. As shown in FIG. 4, native managed code 326B may also be stored as a cached executable image 400 for one or more subsequent executions. For example, the OS or processor may cache the executable image in an on-board cache of processor 402 or system memory 404. Generally, the caching may be performed expressly or via normal operating system and/or processor caching operations.

As discussed above, in some implementations adequate firmware storage will be available to store JIT compiler 328 in platform firmware, enabling the JIT compiler to be available during the pre-boot. Thus, IL-encoded images may be JIT-ed during the pre-boot via JIT compiler 328, either directly or after verification by pre-boot verifier 322A. As with runtime JIT compilation, the end result produces executable native managed code 326B, which is executed in execution block 324. Collectively, execution of native managed code 326B supports a managed firmware environment 330 under which firmware runtime drivers may be used in both kernel mode and user mode.

Figure 5:
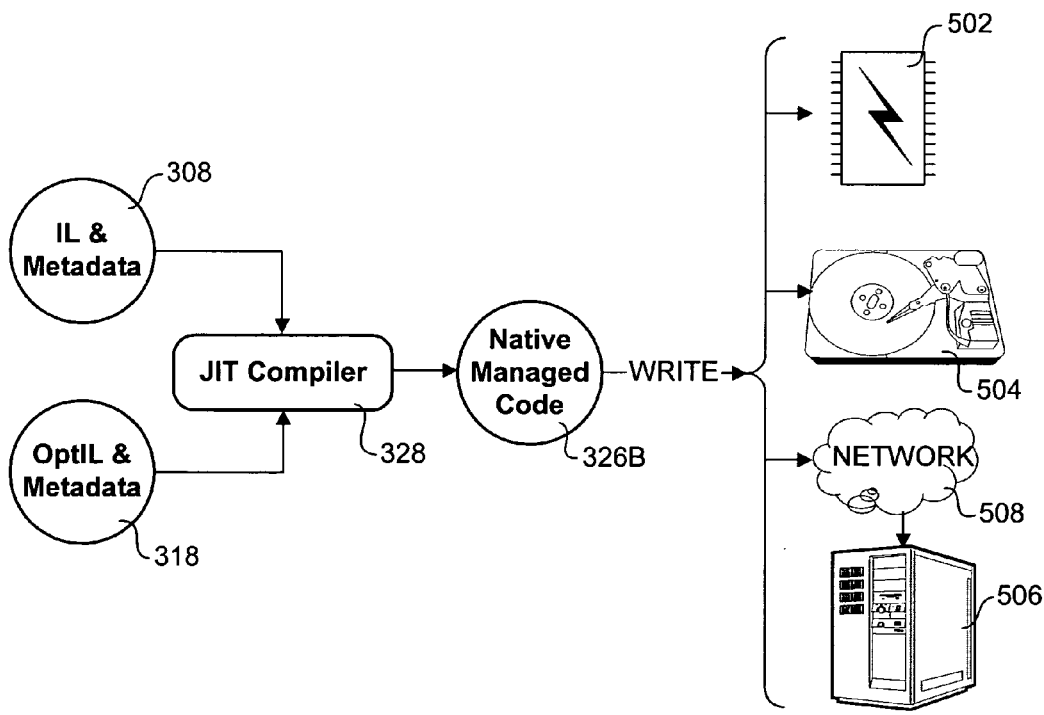
FIG. 5 is a schematic diagram illustrating persistent storage of executable type-safe firmware images for use during subsequent pre-boot operations in accordance with one embodiment of the invention.

In some instances, it may be advantageous to perform a similar caching of JIT-ed IL-encoded images (i.e., native managed code) to a persistent store so as to be accessible during subsequent pre-boots. One implementation for caching native managed code to a persistent store is shown in FIG. 5. In general, the cached executable image 500 needs to be stored in a manner that is accessible to the platform firmware during pre-boot. As discussed above, under the EFI framework, firmware modules may be loaded from many persistent stores, including firmware devices (e.g., flash memory, ROMs, etc.), option ROMs, disks drives, and even network stores. However, in order to cache an executable firmware image, there needs to be a mechanism for updating the firmware on the storage device, which rules out non-writable ROM devices. Thus, the exemplary persistent store options that are left include flash memory 502, firmware accessible portions of a hard disk 504 (e.g., the host-protected area (HPA) or an EFI partition), and network storage 506 accessed via a network 508. Cached executable images may be loaded during subsequent boots as native managed code 326A.

Returning to FIG. 3, additional runtime framework components include a runtime code manager 332 and runtime security checks 334. The runtime code manager interfaces with EFI core, legacy BIOS, and other firmware shown in a block 336. It also may provide an optional interface to support handheld to enterprise hardware, as depicted by a block 338.

Figure 6:
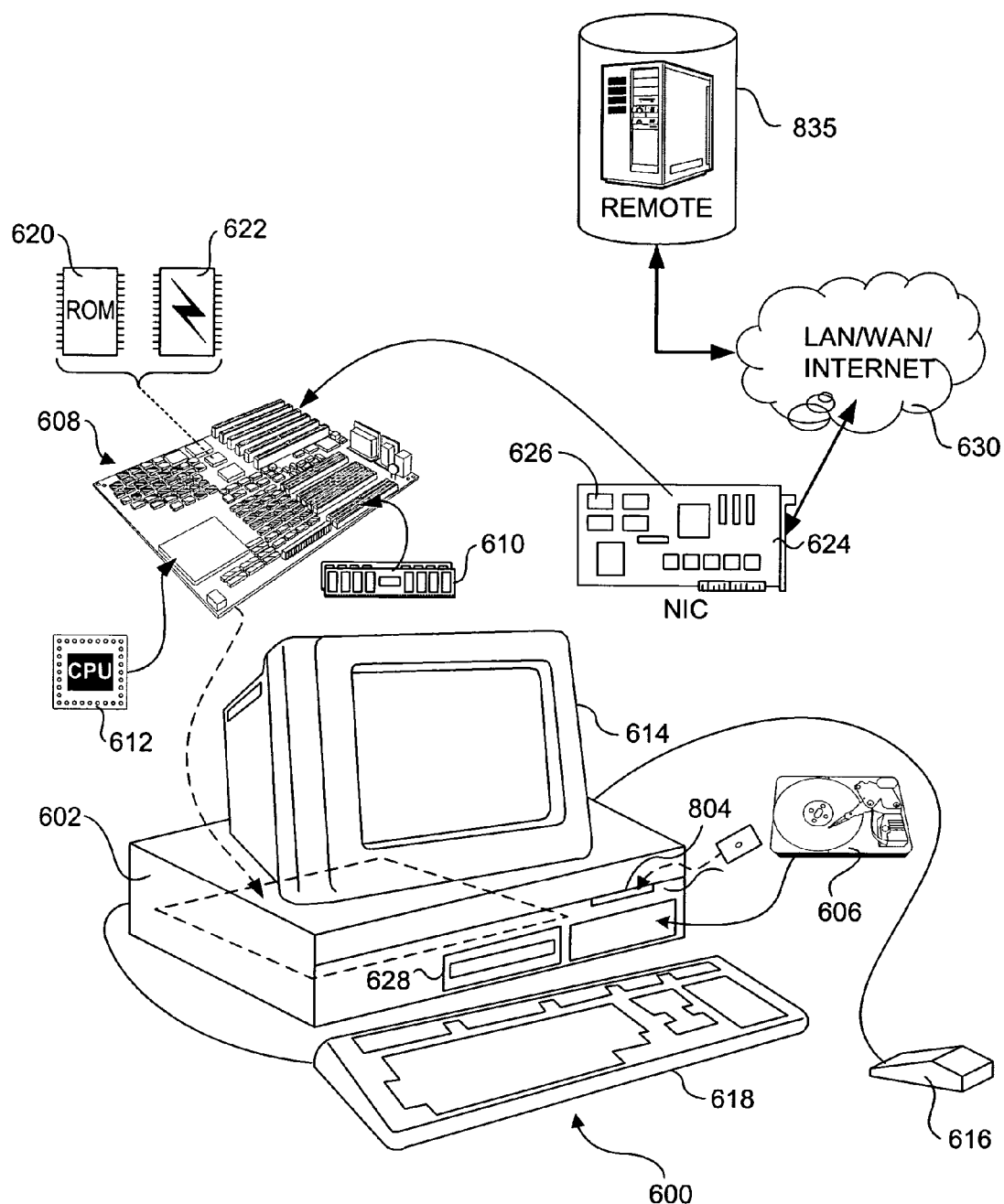
FIG. 6 is a schematic diagram of an exemplary computer system on which embodiments of the invention may be implemented.

FIG. 6 illustrates an embodiment of an exemplary computer system 600 to practice embodiments of the invention described above. Computer system 600 is generally illustrative of various types of computer devices, including personal computers, laptop computers, workstations, servers, etc. For simplicity, only the basic components of the computer system are discussed herein. Computer system 600 includes a chassis 602 in which various components are housed, including a floppy disk drive 604, a hard disk 606, a power supply (not shown), and a motherboard 608. Hard disk 606 may comprise a single unit, or multiple units, and may optionally reside outside of computer system 600. The motherboard 608 includes a memory 610 coupled to one or more processors 612. Memory 610 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Processor 612 may be a conventional microprocessor including, but not limited to, a CISC processor, such as an Intel Corporation x86, Pentium, or Itanium family microprocessor, a Motorola family microprocessor, or a RISC processor, such as a SUN SPARC processor or the like.

The computer system 600 also includes one or more non-volatile memory devices on which firmware is stored. Such non-volatile memory devices include a ROM device 620 or a flash device 622. Other non-volatile memory devices include, but are not limited to, an Erasable Programmable Read Only Memory (EPROM), an Electronically Erasable Programmable Read Only Memory (EEPROM), or the like. The computer system 600 may include other firmware devices as well (not shown).

A monitor 614 is included for displaying graphics and text generated by firmware, software programs and program modules that are run by computer system 600, such as system information presented during system boot. A mouse 616 (or other pointing device) may be connected to a serial port, USB (Universal Serial Bus) port, or other like bus port communicatively coupled to processor 612. A keyboard 618 is communicatively coupled to motherboard 608 in a similar manner as mouse 616 for user entry of text and commands. In one embodiment, computer system 600 also includes a network interface card (NIC) or built-in NIC interface (not shown) for connecting computer system 600 to a computer network 630, such as a local area network (LAN), wide area network (WAN), or the Internet. In one embodiment network 630 is further coupled to a remote computer 635, such that computer system 600 and remote computer 635 can communicate. In one embodiment, a portion of the computer system's firmware is loaded during system boot from remote computer 635.

The illustrated embodiment further includes an optional add-in card 624 that is coupled to an expansion slot of motherboard 608. In one embodiment, add-in card 624 includes an Option ROM 926 on which firmware is stored. Computer system 600 may also optionally include a compact disk-read only memory ("CD-ROM") drive 628 into which a CD-ROM disk may be inserted so that executable files, such as an operating system, and data on the disk can be read or transferred into memory 610 and/or hard disk 606. Other mass memory storage devices may be included in computer system 600.

In another embodiment, computer system 600 is a handheld or palmtop computer, which are sometimes referred to as Personal Digital Assistants (PDAs). Handheld computers may not include a hard disk or other mass storage, and the executable programs are loaded from a corded or wireless network connection into memory 610 for execution by processor 612. A typical computer system 600 will usually include at least a processor 612, memory 610, and a bus (not shown) coupling the memory 610 to the processor 612.

It will be appreciated that in one embodiment, computer system 600 is controlled by operating system software that includes a file management system, such as a disk operating system, which is part of the operating system software. For example, one embodiment of the present invention utilizes Microsoft Windows® as the operating system for computer system 600. In another embodiment, other operating systems such as, but not limited to, an Apple Macintosh operating system, a Linux-based operating system, the Microsoft Windows CE® operating system, a Unix-based operating system, the 3Com Palm operating system, or the like may also be use in accordance with the teachings of the present invention.

Thus, embodiments of this invention may be used as or to support a firmware and software code executed upon some form of processing core (such as processor 612) or otherwise implemented or realized upon or within a machine-readable medium. A machine-readable medium includes any tangible mechanism that may be used to store information in a form readable by a machine (e.g. a computer, network device, personal digital assistant, manufacturing tool, any device with a set of one or more processors, etc.) The examples set forth are not limiting. The information stored on the machine-readable medium may be transmitted via transmission medium wherein the transmission medium may include propagated signals such as electrical, optical, acoustical or other form of propagated signals (e.g. carrier waves, infrared signals, digital signals, etc.)

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    processing a type-safe platform-independent firmware component during a pre-boot phase of a computer platform, the type-safe platform independent firmware component is processed using an intermediate language (IL) interpreter for IL; and
    processing the type-safe platform-independent firmware component during an operating system—(OS)-runtime phase, the type-safe platform independent firmware component is processed using a Just-in-Time (JIT) compiler for the IL.

2. The method of claim 1, wherein the type-safe platform-independent firmware component is written in a type-safe intermediate language (IL).

3. The method of claim 1, wherein the type-safe platform-independent firmware component is written in a type-safe intermediate language (IL) and is processed using a Just-in-Time (JIT) compiler for the IL during the pre-boot phase.

4. The method of claim 3, wherein processing the IL with the JIT compiler generates an executable image, further comprising storing the executable image to be accessible to platform firmware during a subsequent pre-boot phase for the computer platform.

5. The method of claim 4, wherein the executable image is stored on a platform firmware storage device.

6. The method of claim 4, wherein the executable image is stored in a portion of a disk drive that is accessible to the platform firmware.

7. The method of claim 1, wherein the type-safe platform-independent firmware component is written in a type-safe intermediate language (IL).

8. The method of claim 1, wherein the type-safe platform-independent firmware component is written in an intermediate language in accordance with the Common Language Infrastructure (CLI) standard.

9. The method of claim 1, further comprising performing a type-safety verification on the type-safe platform-independent firmware component prior to processing it during the pre-boot phase.

10. The method of claim 1, further comprising performing a type-safety verification on the type-safe platform-independent firmware component prior to processing it during the OS-runtime phase.

11. A method comprising:
    encoding source code corresponding to a firmware driver into a type-safe intermediate language (IL)-encoded firmware driver;
    processing the type-safe IL-encoded firmware driver during a pre-boot phase of a computer platform using an intermediate language (IL) interpreter for IL; and processing the type-safe IL encoded firmware driver during an operating system (OS) runtime phase using a Just-in-Time (JIT) compiler for the IL.

12. The method of claim 11, wherein the type-safe IL-encoded driver comprises a PE/COFF (Portable Executable/Common Object File Format) image.

13. The method of claim 11, wherein the type-safe IL-encoded driver is encoded into IL code defined by the Common Language Infrastructure (CLI) standard.

14. The method of claim 11, further comprising verifying the type-safe IL-encoded firmware driver for type-safety prior to its processing.

15. The method of claim 11, wherein the type-safe IL-encoded firmware driver is processed using an IL interpreter.

16. The method of claim 11, wherein the type-safe IL-encoded firmware driver is processed using a Just-in-Time (JIT) compiler.

17. The method of claim 11, wherein the type-safe IL-encoded firmware driver is compliant with the Extensible Firmware Interface (EFI) standard.

18. The method of claim 11, wherein the type-safe IL-encoded firmware driver is accessed during OS-runtime by an operating system user mode.

19. The method of claim 11, wherein the type-safe IL-encoded firmware driver is accessed during OS-runtime by an operating system kernel mode.

20. A machine-readable storage media to provide instructions, which when executed perform operations comprising:
    loading a type-safe processor-neutral firmware module into a pre-boot environment;
    loading the type-safe processor-neutral firmware module into an operating system runtime environment; and
    processing the type-safe processor-neutral firmware module via a virtual processor in the pre-boot environment.

21. The machine-readable storage media of claim 20, wherein the instructions including native instructions corresponding to an interpreter to operate as the virtual processor.

22. The machine-readable storage media of claim 20, wherein the instructions including native instructions corresponding to a Just-in-Time (JIT) compiler to operate as the virtual processor.

23. The machine-readable storage media of claim 20, wherein the instructions include instructions written in intermediate language (IL) code.

24. The machine-readable storage media of claim 23, wherein the IL code is compliant with the Common Language Infrastructure (CLI) standard.

25. The machine-readable storage media of claim 20, wherein the media comprises a firmware storage device, and the instructions comprise firmware instructions.

26. The machine-readable storage media of claim 20, wherein execution of the instructions performs the further operation of publishing an interface via which an operating system (OS) may access the type-safe processor-neutral firmware module during OS runtime operations.

27. A computer system, comprising:
    a system processor,
    memory, coupled to the processor; and
    a flash device on which firmware is stored, said firmware including a plurality of firmware drivers written in a type-safe intermediate language and native instructions, the flash device further including a virtual processor to be hosted by the system processor, said virtual processor to process the plurality of firmware drivers during a pre-boot phase for the computer system.

28. The computer system of claim 27, wherein the type-safe intermediate language is compliant with the Common Language Infrastructure (CLI) standard.

29. The computer system of claim 28, wherein the virtual processor comprises a CLI-compliant interpreter.

30. The computer system of claim 28, wherein the virtual processor comprises a CLI-compliant Just-in-Time (JIT) compiler.

* * * * *